United States Patent
Koo et al.

(10) Patent No.: US 8,265,570 B2
(45) Date of Patent: Sep. 11, 2012

(54) RFID READER AND RF TRANSMISSION METHOD THEREOF

(75) Inventors: Jin-Hun Koo, Yongin-si (KR); Young-Hoon Min, Anyang-si (KR); Si-Gyoung Koo, Seoul (KR); Il-Jong Song, Yongin-si (KR); Kuang-Woo Nam, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1039 days.

(21) Appl. No.: 12/204,985

(22) Filed: Sep. 5, 2008

(65) Prior Publication Data

US 2009/0066480 A1    Mar. 12, 2009

(30) Foreign Application Priority Data

Sep. 7, 2007  (KR) .................. 10-2007-0091032

(51) Int. Cl.
*H04B 1/44* (2006.01)
(52) U.S. Cl. .......... 455/83; 455/63.1; 455/84; 455/41.1; 455/84.2; 350/10.1; 350/10.4; 350/10.51; 350/572
(58) Field of Classification Search .................. 455/83, 455/63.1, 84, 41.1, 84.2; 340/10.1, 10.4, 340/10.51, 572
See application file for complete search history.

(56) References Cited

U.S. PATENT DOCUMENTS

| 7,904,032 B2 * | 3/2011 | Claessen ........................ 455/83 |
| 2006/0261954 A1 * | 11/2006 | Dietrich et al. ............ 340/572.2 |
| 2007/0001813 A1 * | 1/2007 | Maguire et al. ............. 340/10.2 |
| 2007/0120675 A1 * | 5/2007 | Koo et al. ................. 340/572.2 |
| 2007/0139162 A1 * | 6/2007 | Bandy et al. ................ 340/10.2 |
| 2007/0159302 A1 * | 7/2007 | Park .............................. 340/10.2 |
| 2007/0206705 A1 * | 9/2007 | Stewart ........................ 375/316 |

FOREIGN PATENT DOCUMENTS

| JP | 06-164477 | 6/1994 |
| JP | 2000-102061 | 4/2000 |
| KR | 100617322 | 8/2006 |
| KR | 100641380 | 10/2006 |
| KR | 1020060122457 | 11/2006 |
| KR | 1020070034415 | 3/2007 |

* cited by examiner

*Primary Examiner* — Matthew Anderson
*Assistant Examiner* — Ganiyu A Hanidu
(74) *Attorney, Agent, or Firm* — F. Chau & Associates, LLC (57) ABSTRACT

A Radio Frequency (RF) transmission method of a Radio Frequency Identification (RFID) reader using a plurality of channels is provided. The method includes: selecting at least part of the plurality of channels, measuring an RF power of each of the selected channels, determining a transmission environment of the RF according to a measurement determination, and modulating an RF signal according to the determined transmission environment.

19 Claims, 7 Drawing Sheets

RFID READER AND RF TRANSMISSION METHOD THEREOF

CROSS-REFERENCE TO RELATED APPLICATIONS

This patent application claims priority under 35 U.S.C. §119 to Korean Patent Application No. 10-2007-0091032, filed on Sep. 7, 2007, the disclosure of which is incorporated by reference herein.

BACKGROUND

1. Technical Field

The present disclosure relates to a Radio Frequency Identification (RFID) reader, and more particularly, to an RFID reader using a plurality of channels and a Radio Frequency (RF) transmission method thereof.

2. Discussion of Related Art

RFID is an automatic identification method that relies on storing and remotely retrieving data using devices called RFID tags or transponders. An RFID tag is an object that can be applied to or incorporated into a product, animal, or person for the purpose of identification using radio waves. An RFID system may include a plurality of RFID tags (or, transponders), each attached to a different object and having characteristic identification information and an RFID reader for reading the RFID tag information. RFID tags may be classified as a passive type or active type. Passive type RFID tags have no internal power supply. A small amount of electrical current is induced in a passive RFID tag by a radio frequency (RF) signal transmitted from an RFID reader. The induced current provides just enough power in the passive RFID tag to power up and transmit a response to the RFID reader. Active type RFID tags have their own internal power source. The power source is used to power an active type RFID and broadcast a response signal to the RFID reader.

Figure 1:
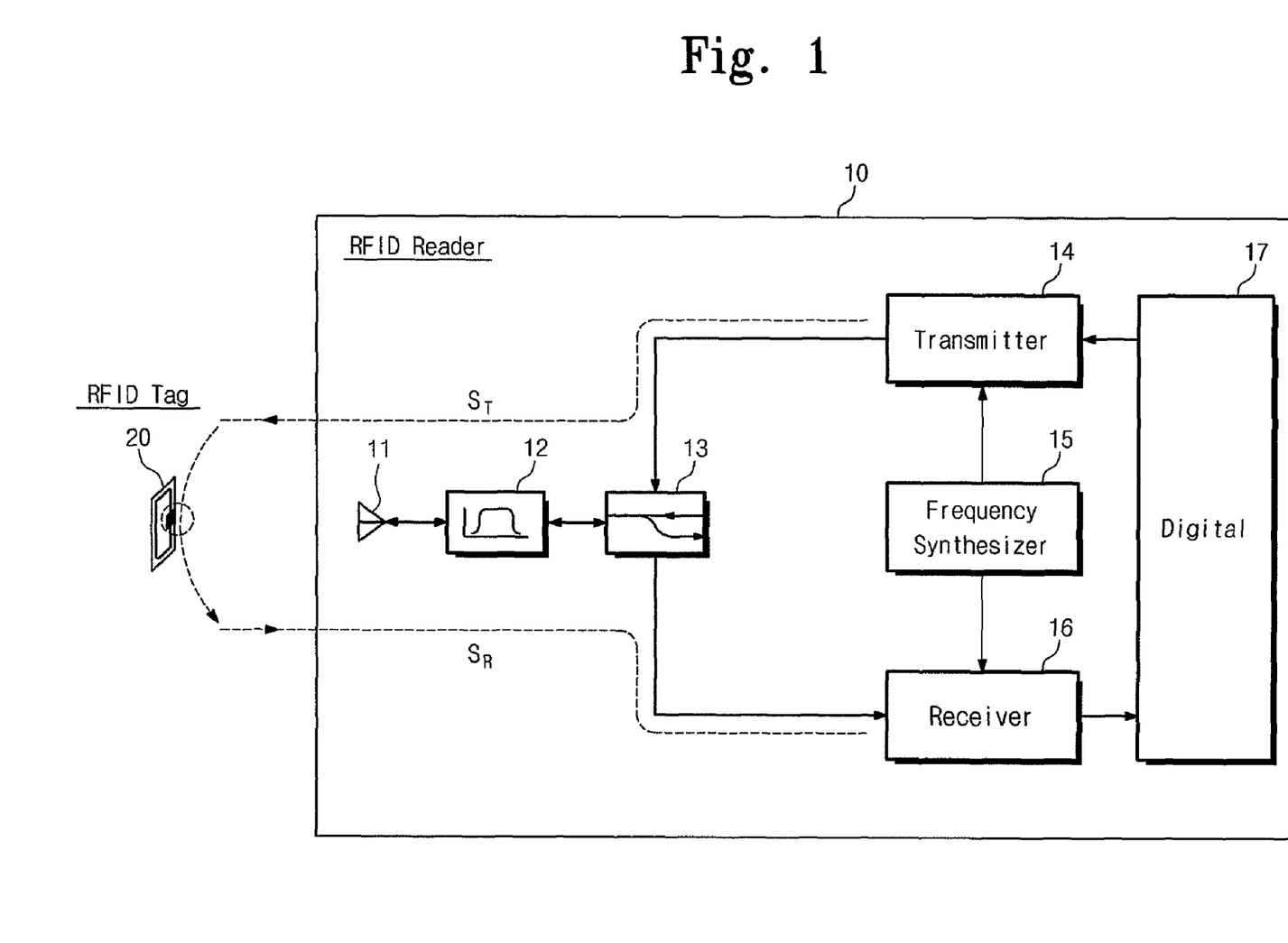
FIG. 1 is a block diagram illustrating a conventional RFID system.

FIG. 1 is a block diagram illustrating a conventional RFID system. Referring to FIG. 1, the RFID system includes an RFID reader 10 and an RFID tag 20. The RFID system transmit signals from the RFID reader 10 and responds to signals from the RFID tag 20, thereby enabling communication between the RFID reader 10 and the RFID tag 20.

The RFID reader 10 includes an antenna 11, an RF filter 12, a directional coupler 13, a transmitter 14, a frequency synthesizer 15, a receiver 16, and a digital signal processor 17. According to a communication protocol of a passive RFID system, the transmitter 14 of the RFID reader 10 alternately transmits a modulated signal and a Continuous Wave (CW) signal in response to a baseband signal received from the digital signal processor 17.

When the RFID reader 10 transmits a modulated signal, the RFID tag 20 only receives the modulated signal, but does not transmit a response signal. Thus, there is no signal received by the RFID reader 10. However, when the RFID reader 10 transmits a CW signal, there is a response signal from the RFID tag 20. Thus, the receiver 16 of the RFID reader 10 needs to process the received signal.

The RFID tag 20 absorbs a part of the CW signal from the RFID reader 10 and reflects the rest of it. The reflected signal is a response signal from the RFID tag 20. The RFID reader 10 receives a signal while transmitting the CW signal. The RFID reader 10 uses the same frequency while transmitting and receiving a signal.

The transmitter 14 generates a CW signal and then transmits it to the directional coupler 13. When the CW signal passes through the directional coupler 13, a part of it is transmitted to the receiver 16, and the rest of it passes through the RF filter 12 and the antenna 11 and then is transmitted to the RFID tag 20. Since the RFID reader 10 uses one antenna for both transmittance and reception, it separates the transmittance from the reception by using the directional coupler 13. For example, a transmit signal may be transmitted only toward the antenna 11 by using the directional coupler 13.

An Ultra-High Frequency (860 MHZ to 960 MHZ) band is used as an RF band of the RFID system. Domestic passive RFID radio equipment is prescribed to use a frequency occupation method (e.g., a Frequency Hopping Spread Spectrum (FHSS) or Listen Before Talk method (LBT)) for access through a channel band width of 200 kHz in a range of 908.5 MHz to 915 MHz.

The FHSS method selects another frequency band to prevent communication interference if a predetermined channel occupation time elapses by using several frequency bands. The FHSS method is commonly employed in the United States due to the availability of a broad frequency band. However, the LBT method is used as standard only when a channel is empty after searching an available channel before transmitting data. The LBT method is commonly employed in Europe due to its narrow frequency band.

An operating environment of the RFID reader 10 is classified according to the number of readers in a predetermined area (e.g., an area within a 1 Km radius). For example, when there are 25 available frequency channels in an operating environment, the environment is considered a single-interrogator environment when only one RFID reader is present therein. The environment is considered a multiple interrogator environment when between 2 and 25 RFID readers are present therein. The environment is considered a dense interrogator environment when more than 25 readers are present therein.

Figure 2:
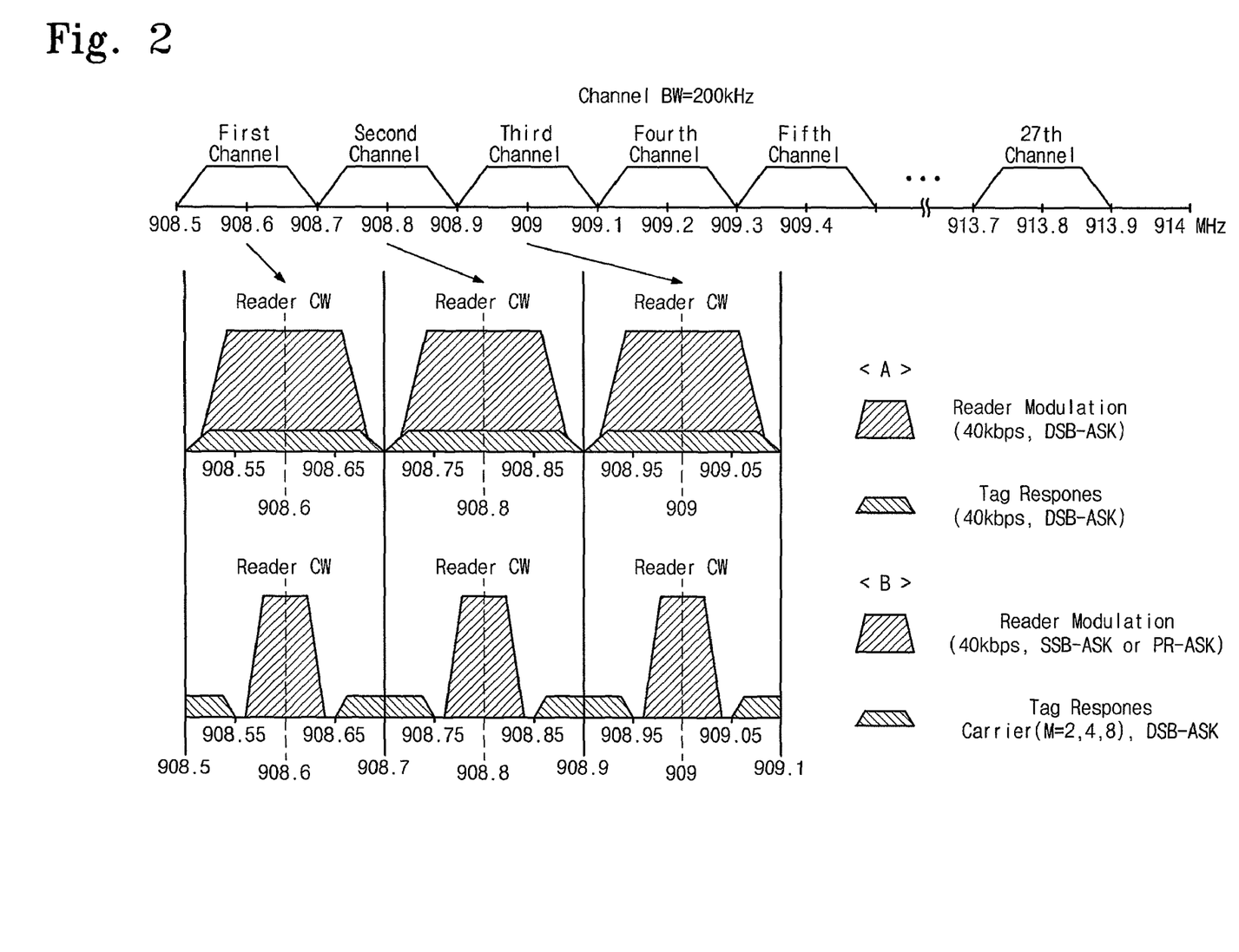
FIG. 2 is a view illustrating a frequency allocation method for conventional domestic RFID/USN radio equipment.

FIG. 2 is a view illustrating a frequency allocation method for conventional domestic RFID/USN radio equipment. As illustrated in FIG. 2, frequency allocation for the domestic passive RFID/USN radio equipment is prescribed to utilize 200 kHz bands ranging from 908.5 MHz to 914 MHz. Accordingly, there are 27 total available frequency bands.

Section <A> of FIG. 2 illustrates a conventional frequency allocation method in a single-interrogator environment or a multiple interrogator environment. A large trapezoid represents a frequency bandwidth when an RFID reader performs a Double-SideBand Amplitude-Shift Keying (DSB-ASK) modulation with respect to a data rate of 40 kbps, and a small trapezoid represents a frequency bandwidth when an RFID tag encodes data through a Frequency Modulation 0 (FM0) method with respect to a data rate of 40 kbps and then responds through a DSB-ASK modulation.

Section <B> of FIG. 2 illustrates a conventional frequency allocation method used in a dense interrogator environment or a multiple interrogator environment. A large trapezoid represents a frequency bandwidth when an RFID reader performs a Single-SideBand Amplitude-Shift Keying (SSB-ASK) or Phase-Reversal Amplitude-Shift Keying (PR-ASK) modulation with respect to a data rate of 40 kbps, and a small trapezoid represents a frequency bandwidth when a tag encodes data through a Miller Subcarrier method with respect to a data rate of 40 kbps and then responds through a DSB-ASK modulation.

When several RFID readers are present an RFID environment, there is a greater possibility of communication interference between the readers. The communication interference can cause performance of RFID readers used in a same area to deteriorate.

Thus, there is a need for an RFID reader that can reduce or prevent interference amongst adjacent RFID readers.

SUMMARY OF THE INVENTION

An exemplary embodiment of the present invention includes a Radio Frequency (RF) transmission method of a Radio Frequency Identification (RFID) reader using a plurality of channels. The method includes: selecting at least part of the plurality of channels, measuring an RF power of each of the selected channels, determining a transmission environment according to a measurement determination, and modulating an RF signal according to the determined transmission environment.

The transmission environment of the determined RF transmission environment may be one of a multiple interrogator environment or a dense interrogator environment. The determining may further include determining a number of the selected measured channels having a higher RF power than a reference power by comparing the measured RF powers with the reference power, and determining the transmission environment based on the determined number.

The method may further include transmitting the RF signal via a dense interrogator environment when the number of measured channels is greater than a reference number, or transmitting the RF signal via a multiple interrogator environment when the number of measured channels is less than the reference number. Each of the selected channels may be measured during a predetermined time, the predetermined time being determined by considering a duty cycle. When selecting a part of the channels, the selected channels may be obtained through arbitrary sampling. The method may further include storing an available channel having a smaller RF power than the reference power among the measured channels. The method may further include transmitting the RF signal through the available channel.

An exemplary embodiment of the present invention includes an RFID reader transmitting an RF signal through a plurality of channels. The RFID reader includes: an RF power detector, a controller, and a baseband modulator. The RF power detector is configured to select at least part of the plurality of channels and measure an RF power of each of the selected channels. The controller is configured to receive the RF power of each of the selected channels from the RF power detector and determine a transmission environment of a current RF transmission environment. The baseband modulator is configured to modulate an RF signal according to the determined transmission environment and in response to a select signal of the controller.

The determined transmission environment may be one of a multiple interrogator environment or a dense interrogator environment. The controller may measure the number of channels having a higher RF power than a reference power among the selected channels. The controller may select a dense interrogator environment when the number of measured channels is greater than a reference number and may select a multiple interrogator environment when the number of measured channels is less than the reference number.

The controller may store an available channel having a smaller RF power than the reference power among the measured channels. The RF signal may be transmitted through the available channel.

The RF power detector may measure each RF power of the selected channels during a predetermined time, the predetermined time being determined by considering a duty cycle. When selecting a part of the channels, the RF power detector may measure each RF power of arbitrary-sampled channels among the selected channels.

The baseband modulator may include: a Double-SideBand Amplitude-Shift Keying (DSB-ASK) modulator and a multi-reader transmission filter. The DSB-ASK modulator may be for modulating an output signal of the controller into a DSB-ASK type. The multi-reader transmission filter may be for changing a transmission environment of the RF signal into a multiple interrogator environment.

The baseband modulator may include: a Phase-Reversal Amplitude-Shift Keying (PR-ASK) modulator and a dense-reader transmission filter. The PR-ASK modulator may be for modulating an output signal of the controller into a PR-ASK type. The dense-reader transmission filter may be for changing a transmission environment of the RF signal into a dense interrogator environment.

The baseband modulator may include: a selector and Hilbert transformer instead of the PR-ASK modulator and the dense-reader transmission filter. The Hilbert transformer may be for receiving an output signal of the multi-reader transmission filter. The selector may be for selecting one of an output signal of the multi-reader transmission filter, an output signal of the Hilbert transformer, or a ground signal in response to a select signal of the controller. When the selector selects the output of the Hilbert transformer, the transmission environment may change into the dense interrogator environment.

BRIEF DESCRIPTION OF THE DRAWINGS

The present invention will become readily apparent with reference to the following detailed description when considered in conjunction with the accompanying drawings. The drawings illustrate exemplary embodiments of the present invention. In the figures.

DETAILED DESCRIPTION OF EXEMPLARY EMBODIMENTS

Hereinafter, exemplary embodiments of the present invention will be described in detail with reference to the accompanying drawings.

Figure 3:
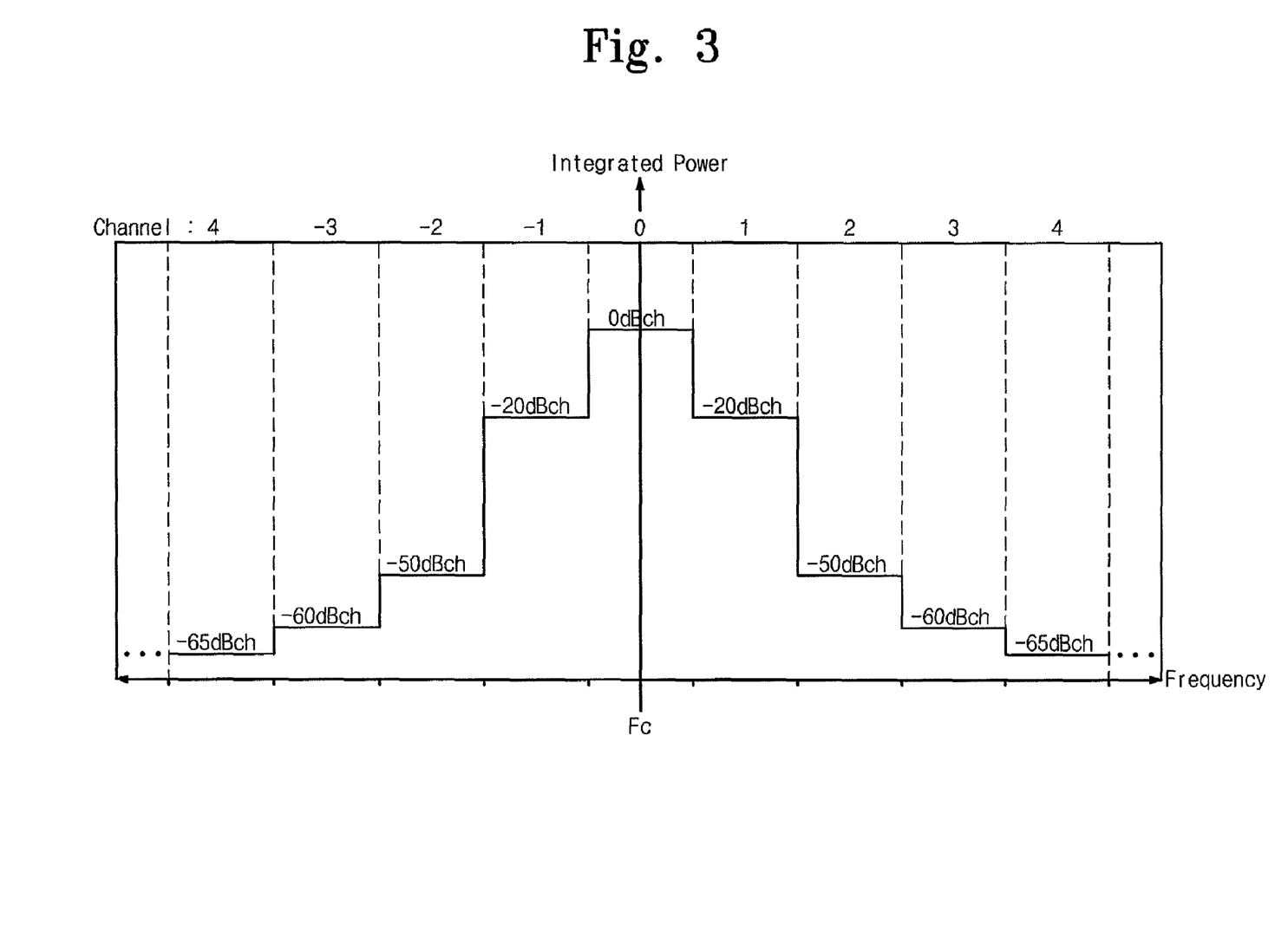
FIG. 3 is a graph illustrating power distribution in an multiple interrogator environment.

FIG. 3 is a graph illustrating power distribution in a multiple interrogator environment. In FIG. 3, an x-axis is a frequency and a y-axis is an integrated power. Referring to FIG. 3, there are nine channels from −4 to +4 according to a frequency distribution.

Assume that a Radio Frequency Identification (RFID) reader transmits a radio frequency (RF) through channel R. In FIG. 3, channel R is a relative value and may be illustrated as channel 0. An RF power in channel R is illustrated as 0 dBch. In a multiple interrogator environment, an RF power does not exceed a specific RF power value in another channel S (S≠R) except for channel R.

When R=0 and S=−1 or +1, an RF power P(S) in a channel S with respect to an RF power P(R) in a channel R is less than −20 dB as shown in Equation (1) as follows:

$$10\log\frac{P(S)}{P(R)} < -20 \text{ dB}. \quad (1)$$

When R=0 and S=−2 or +2, an RF power P(S) in a channel S with respect to an RF power P(R) in a channel R is less than −50 dB as shown in Equation (2) as follows:

$$10\log\frac{P(S)}{P(R)} < -50 \text{ dB}. \quad (2)$$

When R=0 and S=−3 or +3, an RF power P(S) in a channel S with respect to an RF power P(R) in a channel R is less than −60 dB as shown in Equation (3) as follows:

$$10\log\frac{P(S)}{P(R)} < -60 \text{ dB}. \quad (3)$$

When R=0 and S=−4 or +4, an RF power P(S) in a channel S with respect to an RF power P(R) in a channel R is less than −65 dB as shown in Equation (4) as follows:

$$10\log\frac{P(S)}{P(R)} < -65 \text{ dB}. \quad (4)$$

As illustrated in FIG. 3, if an RF signal is transmitted using a specific channel (e.g., R=0) in a multiple interrogator environment, communication interference corresponding to about 20 dB, 50 dB, 60 dB, and 65 dB may occur in another channel.

Figure 4:
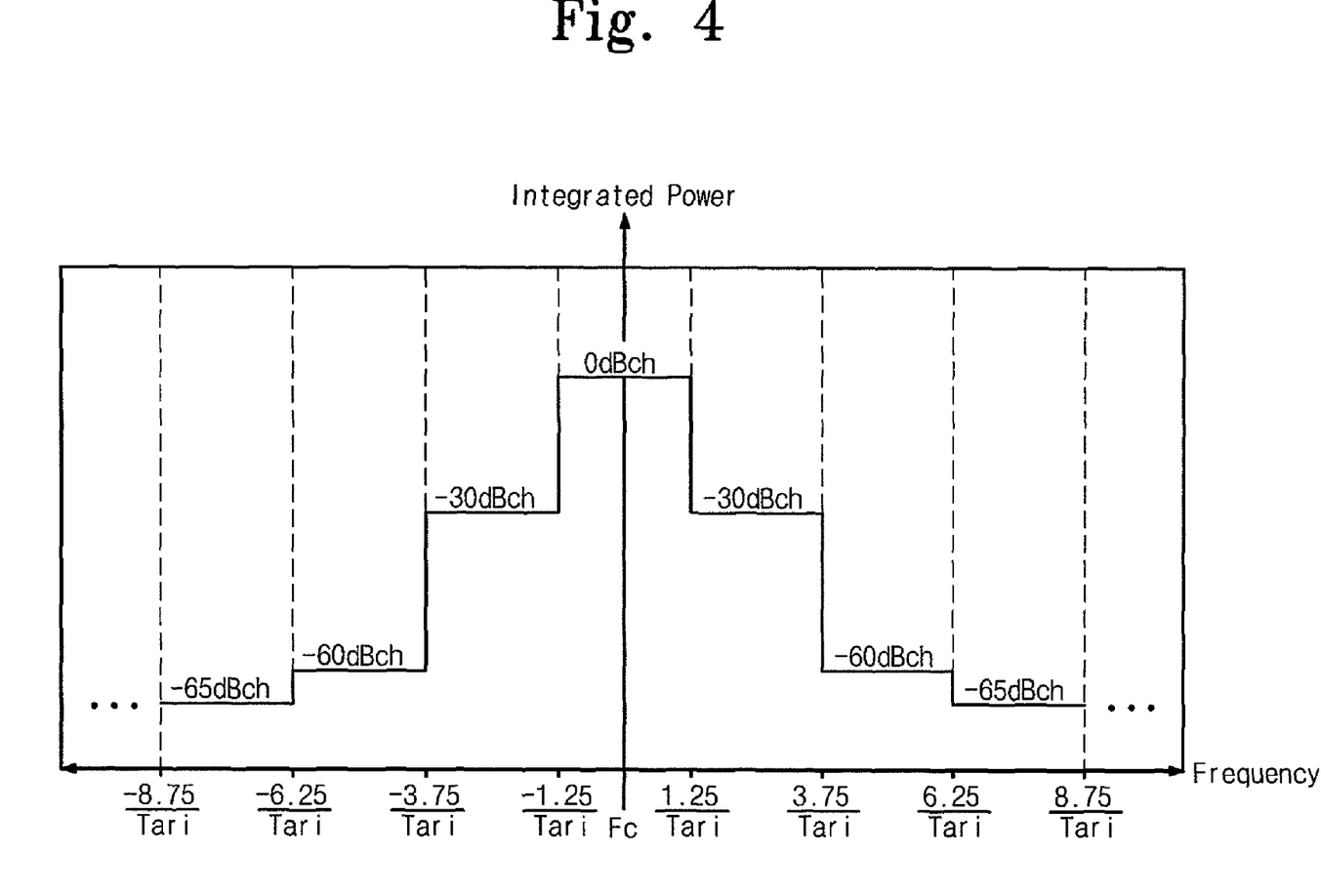
FIG. 4 is a graph illustrating power distribution in a dense interrogator environment.

FIG. 4 is a graph illustrating power distribution in a dense interrogator environment. In FIG. 4, an x-axis is a frequency bandwidth and a y-axis is an integrated power. In FIG. 4, Tari means a duration time of data 0, and each interval of all of the bandwidths is 2.5/Tari. A 2.5/Tari bandwidth at a center frequency fc is called a resolution bandwidth (RBW) and a bandwidth at a frequency an integer multiple of 2.5/Tari from the center frequency is called a spectral bandwidth (SBW).

In a dense interrogator environment, an RF power P(SBW) in the SBW with respect to an RF power P(RBW) in the RBW should not exceed the corresponding power values of 30 dB, 60 dB, and 65 dB as illustrated in FIG. 4.

An RFID reader can be hardwired to be more suitable for a multiple interrogator environment or a dense interrogator environment. A user or an installer needs to determine whether a current environment is a multiple interrogator environment or a dense interrogator environment in order to select the proper RFID reader. For example, this determination can be made by examining RFID reader installation density and usage frequency in a region of interest. However, RFID tag identification may become difficult due to communication interference between RFID readers when an RFID reader that is suitable for a multiple interrogator environment is used in a dense interrogator environment.

Portable RFID readers are being increasingly used. However, the user of a portable RFID reader may not know whether the RFID reader should be used in a multiple interrogator environment or a dense interrogator environment. Further, the RFID environment type can fluctuate as the portable RFID readers are moved in and out of respective areas. Accordingly, movement of a portable RFID reader into an area may deteriorate the performance of another RFID reader in the same area. For example, if an RFID reader of 900 MHz is loaded into a mobile phone, movement of the mobile phone into an area may deteriorate the performance of other RFID readers in the same area.

In at least one embodiment of the present invention, a suitable transmission method is selected by measuring a utilization rate of all or part of the available channels before an RF signal is transmitted. The transmission method varies according to whether a current environment is considered a multiple interrogator environment or a dense interrogator environment. An RFID reader according to at least one embodiment of the present invention selects a transmission method to reduce or prevent communication interference between other adjacent readers.

Figure 5:
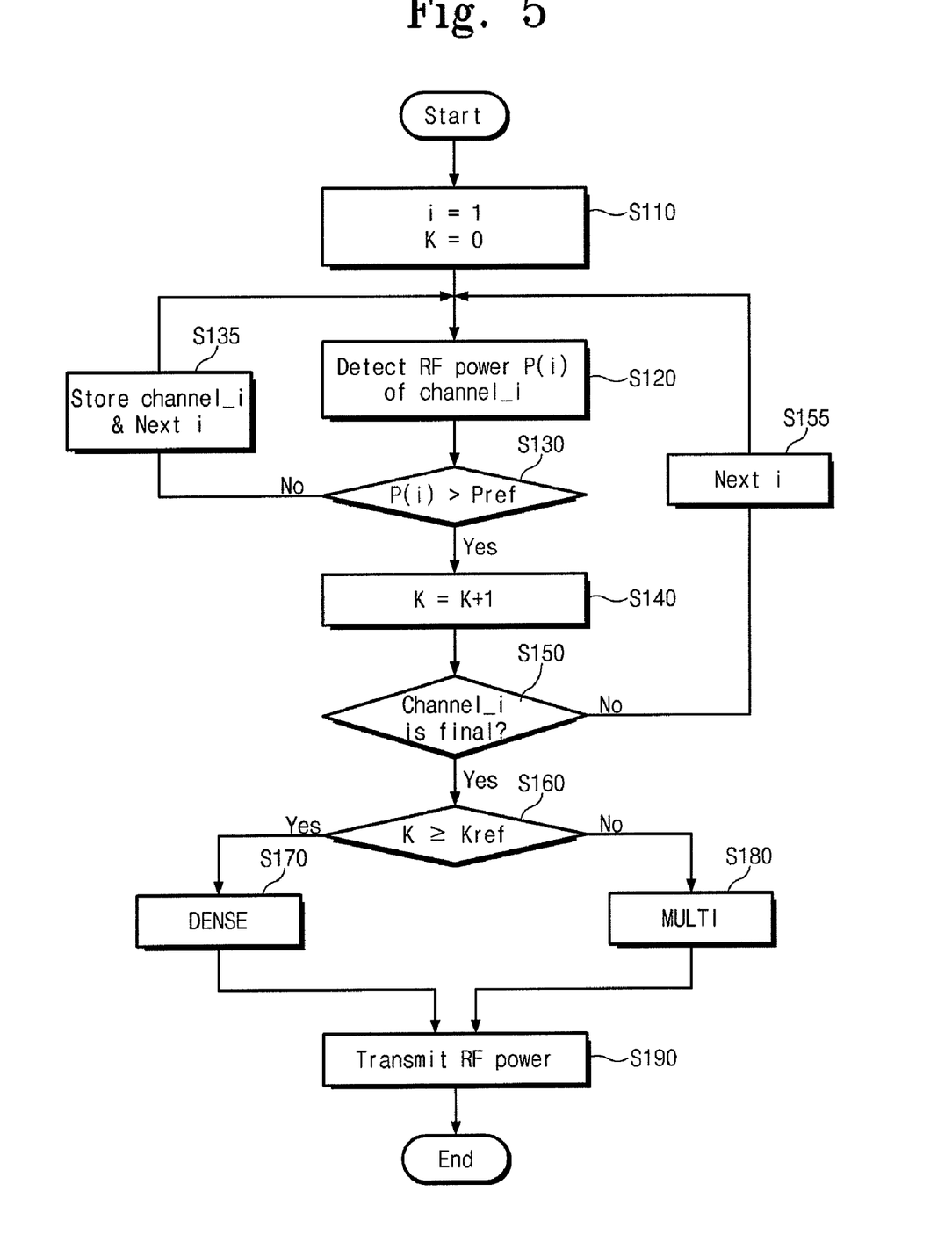
FIG. 5 is a flowchart illustrating an RF transmission method according to an exemplary embodiment of the present invention.

FIG. 5 is a flowchart illustrating an RF signal transmission method according to an exemplary embodiment of the present invention. The RF transmission method includes selecting all or part of a plurality of channels, measuring an RF power of each selected channel, and then determining an RF transmission environment according to a measurement result. The transmission environment may be a multiple interrogator environment or a dense interrogator environment.

In operation S110, a channel variable i is set to 1 and a count variable k is set to 0. In operation S120, an RF power P(i) of channel_i is measured during a predetermined time T. The predetermined time T may be determined by considering a duty cycle of a transmitted signal.

In operation S130, it is determined whether the RF power P(i) is higher than a reference power Pref. For example, if i=1, an RF power P(1) of a channel 1 is measured, and then it is determined whether the RF power P(1) is higher than the reference power Pref. The reference power Pref is an indicator of whether a corresponding channel is occupied by another reader or not. The reference power Pref may be determined empirically through experimentation or by a corresponding regulation.

In operation S130, when the RF power P(i) is not greater than the reference power Pref, the method proceeds to operation S135. In operation S135, a channel_i is stored and then the next channel is selected. The next channel can be selected from the remaining channels or the channel can be selected through arbitrary sampling. Operation S120 may be performed on the next selected channel.

In operation S130, if the RF power P(i) is greater than the reference power Pref, the method proceeds to operation S140. In operation S140, the count variable k is incremented and the method proceeds to operation S150. In operation S150, it is determined whether the channel_i is the last or not. If the channel_i is not the last, the next channel is selected in operation S155 and then the method proceeds to operation S120 again.

In operation S150, if the channel_i is the last, the method proceeds to operation S160. In operation S160, it is determined whether the count variable k is greater than or equal to a reference value Kref. The reference value Kref determines whether a current RFID environment is a multiple interrogator environment or a dense interrogator environment. The reference value Kref is determined by considering at least one of the number of selected channels, an RF power, a power measurement time T, or a corresponding regulation.

In operation S160, if the count variable k is greater than or equal to the reference value Kref, a dense interrogator environment is selected in operation S170. However, if the count variable k is less than the reference value Kref, a multiple interrogator environment is selected in operation S180. In operation S190, a transmit signal is transmitted according to the selected transmission environment. A channel transmitting a transmit signal is used as an available channel stored in operation S135.

At least one embodiment of the present invention alternates between transmission environments (e.g., between a multiple interrogator environment or a dense interrogator environment) according to the RFID readers used in an area such that performance deterioration in adjacent readers due to communication interference can be reduced or prevented. Additionally, at least one embodiment of the present invention uses available channels such that a frequency utilization rate can be improved.

Figure 6:
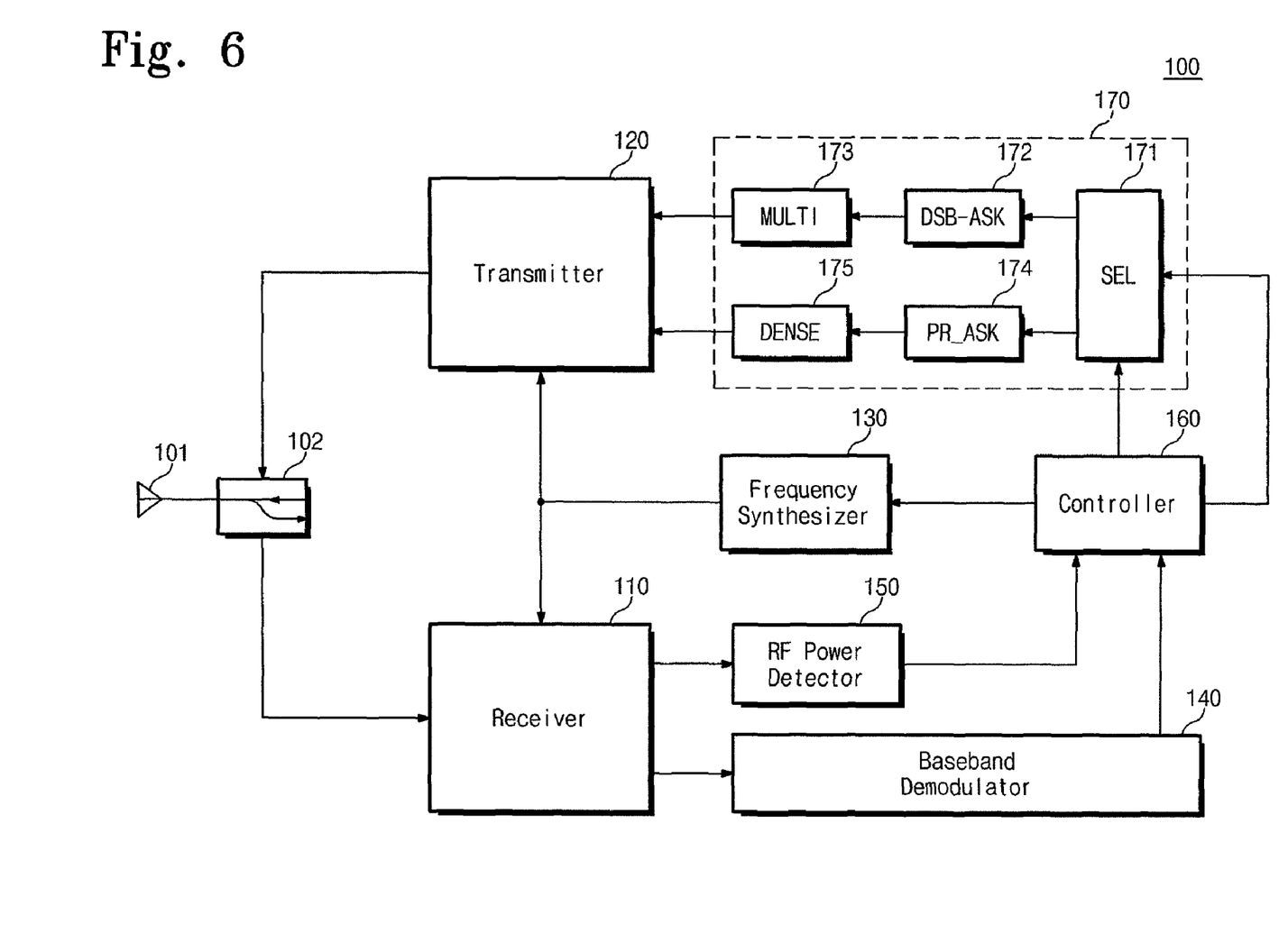
FIG. 6 is a block diagram illustrating an RFID reader according to an exemplary embodiment of the present invention.

FIG. 6 is a block diagram illustrating an RFID reader according to an exemplary embodiment of the present invention. Referring to FIG. 6, the RFID reader 100 includes an antenna 101, a directional coupler 102, a receiver 110, a transmitter 120, a frequency synthesizer 130, a baseband demodulator 140, an RF power detector 150, a controller 160, and a baseband modulator 170.

The receiver 110 receives an RF signal from an RFID tag (not shown) through the antenna 101 and the directional coupler 102. The receiver 110 sends an RF signal to the baseband modulator 140. The transmitter 120 receives the modulated RF signal from the baseband modulator 170. The transmitter 120 transmits an RF signal to the tag through the directional coupler 102 and the antenna 101.

The baseband demodulator 140 demodulates the signal input from the receiver 110 into an demodulated original signal. The baseband demodulator 140 transmits the demodulated original signal to the controller 160. The RF power detector 150 receives a signal from the receiver 110. The RF power detector 150 selects all or a part of a plurality of channels, and then measures an RF power of each selected channel. The RF power detector 150 transmits a measurement result to the controller 160.

The controller 160 receives the measurement result from the RF power detector 150, and then determines a RFID transmission environment. The controller 160 receives an RF power for each channel and determines whether the RF power is higher than the reference power Pref. The channel may be all of the channels or an arbitrarily sampled subset of the channels.

The controller 160 stores which channels have a lower RF power than the reference power Pref. The controller 160 calculates the number of channels having a higher RF power than the reference power Pref among the measured channels. If the number of measured channels is more than the reference value, the controller 160 controls the frequency synthesizer 130 and the baseband modulator 170 to transmit a signal via the dense interrogator environment and if not, it transmits a signal via the multiple interrogator environment.

Referring to FIG. 6, the baseband modulator 170 includes a selector (shown as SEL) 171, a Double-SideBand Amplitude-Shift Keying (DSB-ASK) modulator 172, a multi-reader transmission filter 173, a Phase-Reversal Amplitude-Shift Keying (PR-ASK) modulator 174, and a dense-reader transmission filter 175.

The selector 171 selects a multiple interrogator environment or a dense interrogator environment in response to a select signal from the controller 160. When selecting the multiple interrogator environment, the selector 171 transmits the input signal from the controller 160 to the DSB-ASK modulator 172. In the multiple interrogator environment, the DSB-ASK modulation method is used. The DSB-ASK modulator 172 provides a modulated signal to the multi-reader transmission filter 173. The multi-reader transmission filter 173 provides the filtered signal to the transmitter 120.

When selecting the dense interrogator environment, the selector 171 transmits the signal inputted from the controller 160 to the PR-ASK modulator 174. In the dense interrogator environment, the PR-ASK modulation method is used. The PR-ASK modulator 174 provides a modulated signal to the dense-reader transmission filter 175. The dense-interrogate transmission filter 175 provides the filtered signal to the transmitter 120.

The RFID reader 100 according to at least embodiment of the present invention measures an RF power of each channel and measures the number of channels having a higher RF power than the reference power. If the number of channels is less than the reference value, an RF signal is transmitted through the DSB-ASK modulator and the multi-reader transmission filter. If the number of channels is more than the reference value, an RF signal is transmitted through the PR-ASK modulator and the dense-reader transmission filter.

Figure 7:
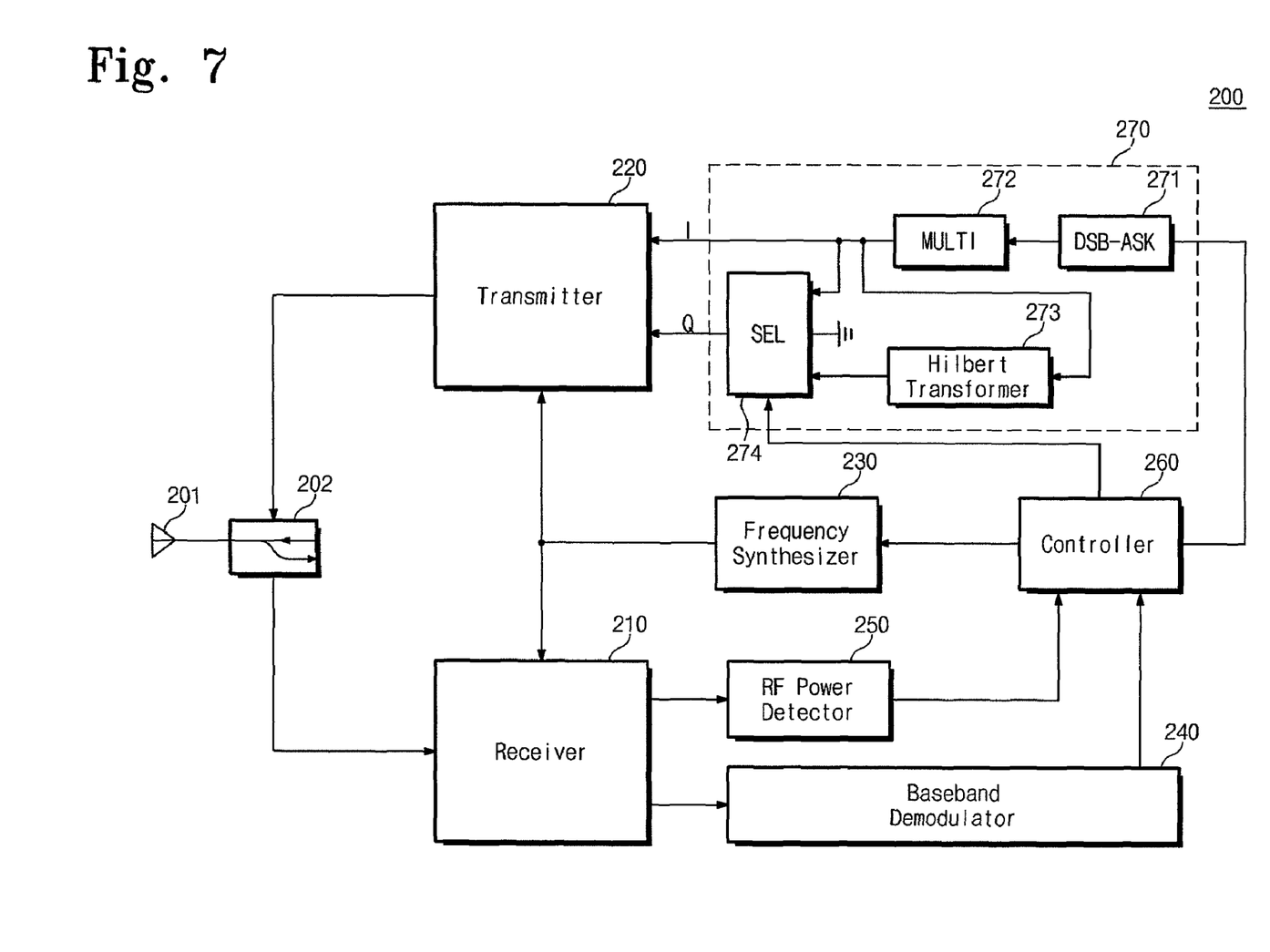
FIG. 7 is a block diagram illustrating an RFID reader according to another exemplary embodiment of the present invention.

FIG. 7 is a block diagram illustrating an RFID reader according to another exemplary embodiment of the present invention. Referring to FIG. 7, the RFID reader 200 includes an antenna 201, a directional coupler 202, a receiver 210, a transmitter 220, a frequency synthesizer 230, a baseband demodulator 240, an RF power detector 250, a controller 260, and a baseband modulator 270. The RFID reader 200 of FIG. 7 has the same structure as FIG. 6 except for the baseband modulator 270.

Referring to FIG. 7, the baseband modulator 270 includes a DSB-ASK modulator 271, a multi-reader transmission filter 272, a Hilbert transformer 273, and a selector (shown as SEL) 274. The DSB-ASK modulator 271 transmits a signal received from the controller 260 to the multi-reader transmission filter 272 for filtering to generate a filtered signal. The multi-reader transmission filter 272 transmits the filtered signal to the transmitter 220 or the Hilbert transformer 273.

The Hilbert transformer 273 does not change the amplitude of a signal but only changes its phase by 180°. The selector 274 selects one of an output of the multi-reader transmission filter 272, a ground signal, and an output of the Hilbert transformer 273. Through these selections, the selector 270 selects a multiple interrogator environment or a dense interrogator environment.

When the multiple interrogator environment is selected, the selector 274 selects one of an output signal of the multi-reader transmission filter 272 or a ground signal. When the dense reader environment is selected, the selector 274 selects an output signal of the Hilbert transformer 273.

The RFID reader 200 according to the present embodiment includes the Hilbert transformer 273 for receiving an output signal of the multi-reader transmission filter 272 and the selector 274 for selecting one of an output of the multi-reader transmission filter 272, an output signal of the Hilbert convert 273, and a ground signal in response to a select signal of the controller 260. When the selector 274 selects an output signal of the Hilbert transformer 273, the transmission environment changes into the dense interrogator environment.

While exemplary embodiments of the present invention have been described, it is understood that the present invention is not limited to these exemplary embodiments, but various changes and modifications can be made by one ordinary skilled in the art within the spirit and scope of the disclosure.

What is claimed is:

1. A Radio Frequency (RF) transmission method of a Radio Frequency Identification (RFID) reader, the method comprising:
   selecting at least a part of a plurality of channels of the RFID;
   measuring an RF power of each of the selected channels;
   determining a transmission environment according to the measured RF powers; and
   modulating an RF signal according to the determined transmission environment, wherein the step of determining comprises:
     determining a total count of the measured channels having a higher RF power than a reference power; and
     determining the transmission environment based on a comparison of the total count and a reference number.

2. The method of claim 1, wherein the determined transmission environment is one of a multiple interrogator environment or a dense interrogator environment.

3. The method of claim 2, further comprising transmitting the RF signal via the dense interrogator environment when the total count is greater than a reference number and transmitting the RF signal via the multiple interrogator environment when the total count is less than the reference number.

4. The method of claim 1, wherein each of the selected channels is measured during a predetermined time, the predetermined time being determined by considering a duty cycle.

5. The method of claim 1, wherein when selecting a part of the channels, the selected channels are obtained through arbitrary sampling.

6. The method of claim 1, further comprising storing an available channel having a smaller RF power than the reference power among the measured channels.

7. The method of claim 6, further comprising transmitting the RF signal through the available channel.

8. An RFID reader comprising:
   an RF power detector configured to select at least part of a plurality of channels and measuring an RF power of each of the selected channels;
   a controller configured to receive the RF power of each of the selected channels from the RF power detector and determining a transmission environment; and
   a baseband modulator for modulating an RF signal according to the determined transmission environment and in response to a select signal of the controller,
   wherein the controller is configured to generate a total count of the selected channels having a higher RF power than a reference power and determine the transmission environment based on a comparison of the total count and a reference number.

9. The RFID reader of claim 8, wherein the determined transmission environment is one of a multiple interrogator environment or a dense interrogator environment.

10. The RFID reader of claim 9, wherein the controller selects the dense interrogator environment when the total count is greater than a reference number, and selects a multiple interrogator environment when the total count is less than the number of reference channels.

11. The RFID reader of claim 9, wherein the controller stores an available channel having a smaller RF power than the reference power among the measured channels.

12. The RFID reader of claim 11, wherein the RF signal is transmitted through the available channel.

13. The RFID reader of claim 8, wherein the RF power detector measures each RF power of the selected channels during a predetermined time, the predetermined time being determined by considering a duty cycle.

14. The RFID reader of claim 13, wherein when selecting a part of the channels, the RF power detector measures each RF power of arbitrary-sampled channels among the selected channels.

15. The RFID reader of claim 8, wherein the baseband modulator comprises:
   a Double-SideBand Amplitude-Shift Keying (DSB-ASK) modulator for modulating an output signal of the controller into a DSB-ASK type; and
   a multi-reader transmission filter for changing a transmission environment of the RF signal into a multiple interrogator environment.

16. The RFID reader of claim 15, wherein the baseband modulator further comprises:
   a Phase-Reversal Amplitude-Shift Keying (PR-ASK) modulator for modulating an output signal of the controller into a PR-ASK type; and
   a dense-reader transmission filter for changing a transmission environment of the RF signal into a dense interrogator environment.

17. The RFID reader of claim 15, wherein the baseband modulator further comprises:
   a Hilbert transformer for receiving an output signal of the multi-reader transmission filter; and
   a selector for selecting one of an output signal of the multi-reader transmission filter, an output signal of the Hilbert transformer, or a ground signal in response to a select signal of the controller.

18. The RFID reader of claim 17, wherein when the selector selects the output of the Hilbert transformer, the transmission environment changes into the dense interrogator environment.

19. A Radio Frequency (RF) transmission method of a Radio Frequency Identification (RFID) reader, the method comprising:
   selecting at least a part of a plurality of channels of the RFID;
   measuring an RF power of each of the selected channels;
   incrementing a count for each RF power measured to exceed a reference power;
   modulating an RF signal using Double-SideBand Amplitude-Shift Keying if the count is less than the reference value; and
   modulating an the RF signal using Phase-Reversal Amplitude-Shift Keying if the count is greater than the reference value.

* * * * *